Figure 1:
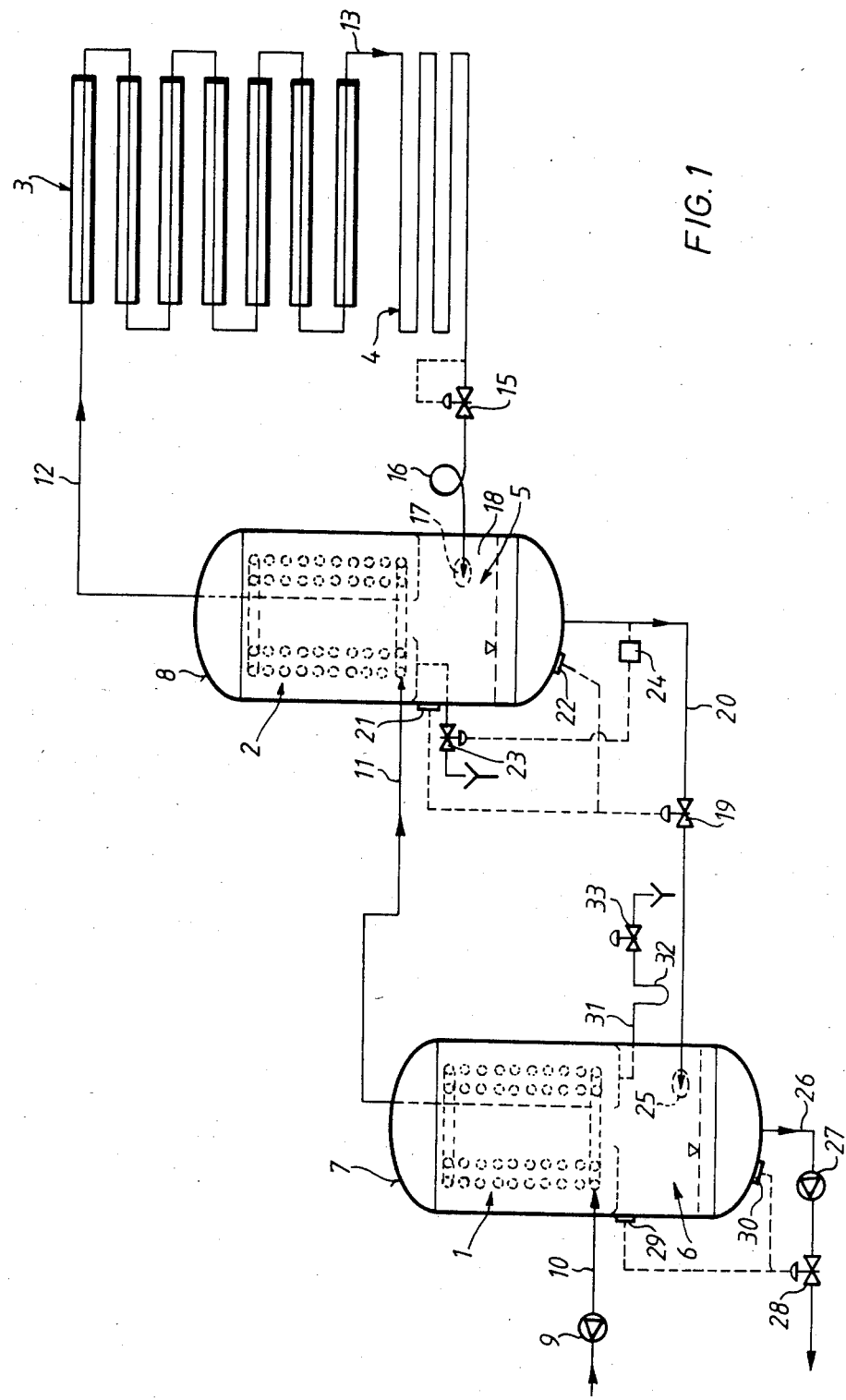

United States Patent [19]

Redl et al.

[11] Patent Number: 4,552,060
[45] Date of Patent: Nov. 12, 1985

[54] APPARATUS FOR THE CONTINUOUS BOILING OF WORT

[76] Inventors: Simon Redl, Dr. George-Schranner-Str. 6, D-8309 Reichertshausen; Alfons Wolfseder, Blumenstr. 13, D-8050 Freising, both of Fed. Rep. of Germany

[21] Appl. No.: 650,514
[22] PCT Filed: Feb. 1, 1984
[86] PCT No.: PCT/DE84/00026
  § 371 Date: Sep. 10, 1984
  § 102(e) Date: Sep. 10, 1984
[87] PCT Pub. No.: WO84/03101
  PCT Pub. Date: Aug. 16, 1984

[30] Foreign Application Priority Data
  Feb. 3, 1983 [DE] Fed. Rep. of Germany ....... 3303671

[51] Int. Cl.[4] ............................................. C12C 13/04
[52] U.S. Cl. ........................................ 99/278; 426/29; 426/495; 435/93
[58] Field of Search ................. 99/228, 276, 275; 426/29, 495, 490; 435/93

[56] References Cited
U.S. PATENT DOCUMENTS

| 3,102,813 | 9/1963 | Shore | 99/278 |
| 3,535,116 | 10/1970 | Harsanyi | 99/278 |
| 4,388,857 | 6/1983 | Korek | 426/29 |
| 4,483,881 | 11/1984 | Lenz | 99/276 |

FOREIGN PATENT DOCUMENTS
2442886 6/1980 France.

Primary Examiner—Robert W. Jenkins
Attorney, Agent, or Firm—Learman & McCulloch

[57] ABSTRACT

The invention relates to apparatus for the continuous boiling of wort in which separators (5 and 6) which serve for depressurization and lowering of the temperature of the wort and for separating off the vapor are each combined into one structural unit (8 and 7 respectively) with the appertaining recuperative heat exchangers (2 and 1 respectively). This results in considerable simplification of the apparatus, a reduction in the amount of space required and an increase in the degree of efficiency from the point of view of heat engineering.

8 Claims, 3 Drawing Figures

APPARATUS FOR THE CONTINUOUS BOILING OF WORT

The invention relates to apparatus for the continuous boiling of wort according to the preamble to claim 1

Known apparatus of this type is described in "Brauwelt" 1981, Volume 3, pages 49 to 51. It contains two recuperative heat exchangers connected in series for gradual raising of the temperature of the wort and two separators connected in series for gradual depressurisation and lowering of the temperature of the wort, the first separator being connected via a vapour pipe to the second recuperative heat exchanger and the second separator being connected via a vapour pipe to the first recuperative heat exchanger.

The object of the invention is to develop this known apparatus for continuous boiling, of wort so that the expenditure on plant and the space required are considerably reduced and an even better degree of efficiency is achieved from the point of view of heat engineering.

This object is achieved according to the invention by the characterising feature of claim 1.

Since the separator which serves for depressurisation and lowering of the temperature of the wort is combined with the recuperative heat exchanger into one single structural unit, numerous parts of the apparatus which were previously necessary are now superfluous, especially the connecting pipe which was previously necessary for connecting the separator to the recuperative heat exchanger as well as various valves and control elements. In this way a considerable saving of space is achieved since the separator and the recuperative heat exchanger are advantageously arranged one above the other in the common housing.

With the omission of the connecting pipes which were previously necessary the heat losses from the apparatus are also reduced, which leads to an improved degree of efficiency from the point of view of heat engineering. Finally, the reduced expenditure on cleaning constitutes a further advantage.

If two recuperative heat exchangers connected in series for gradual raising of the temperature of the wort and two separators connected in series for gradual depressurisation and lowering of the temperature of the wort are provided in the usual way, then according to the invention the first separator is combined with the second recuperative heat exchanger into one structural unit and the second separator is combined with the first recuperative heat exchanger into one structural unit. This produces the advantages described above to an even greater extent.

Advantageous embodiments of the invention are the subject matter of the subordinate claims and are explained in connection with the description of several embodiments which are illustrated in the drawings.

Figure 2:
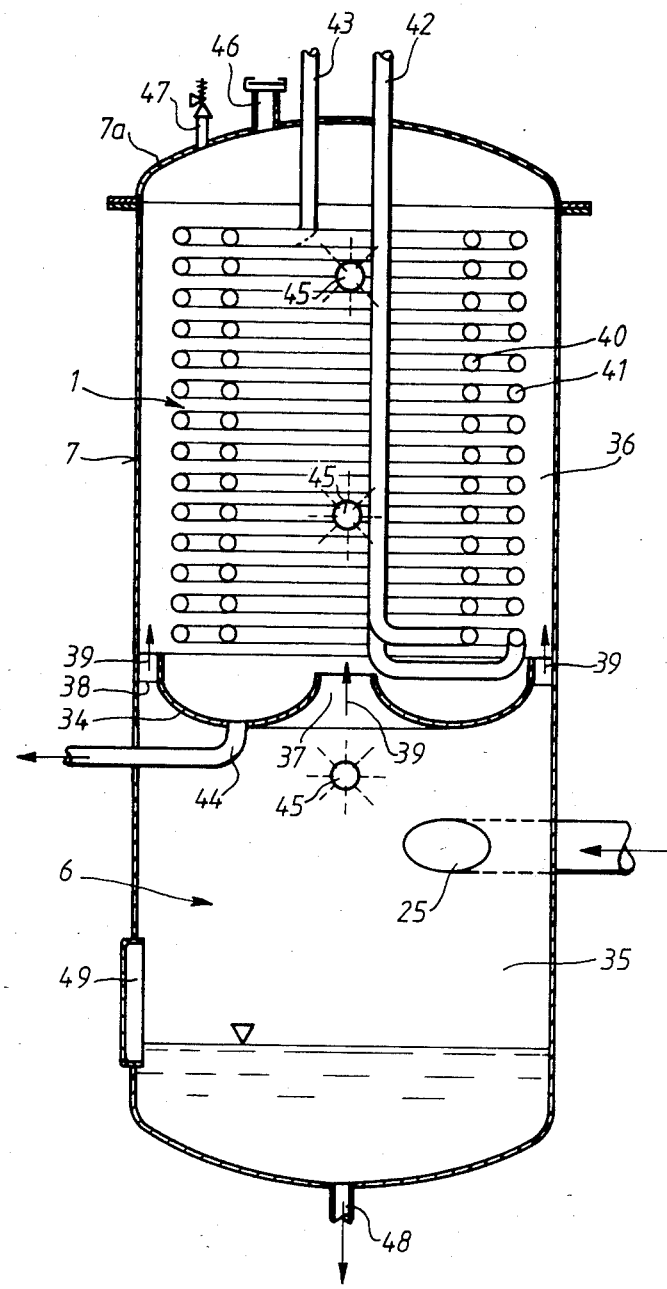
Figure 3:
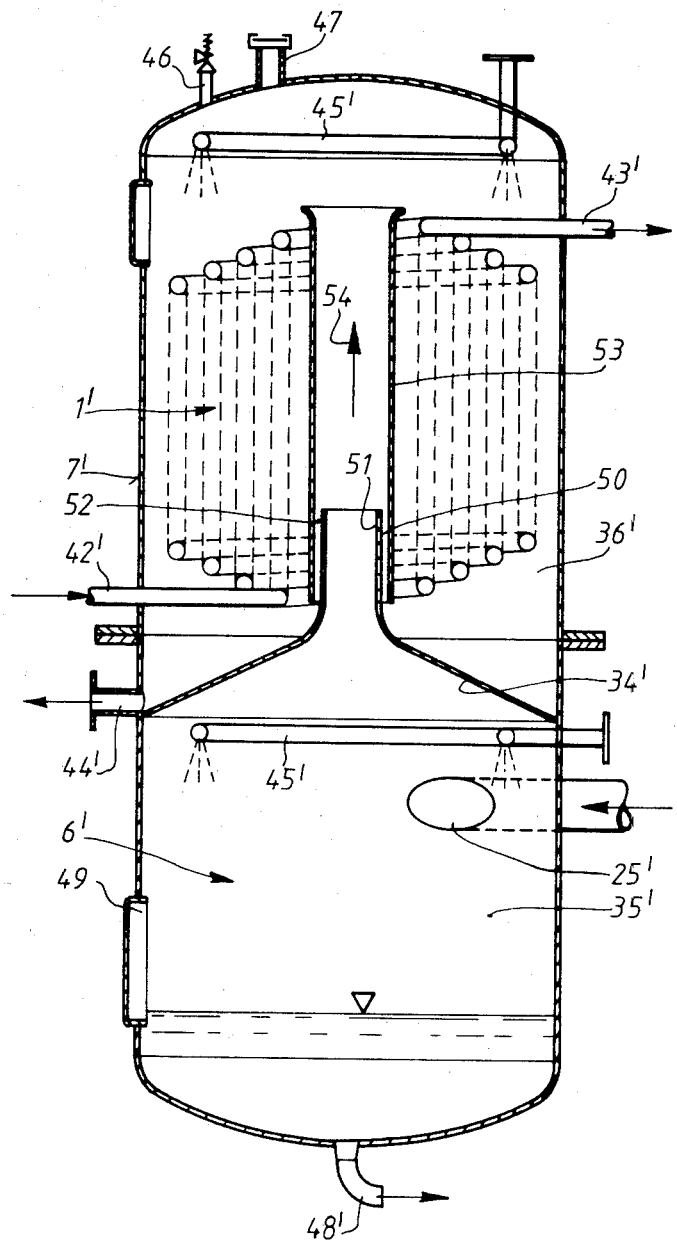

In the drawings:

FIG. 1 shows a general layout of apparatus according to the invention for continuous boiling of wort, FIGS. 2 and 3 each show the layout of an embodiment of a combined separator and heat exchanger.

The apparatus shown in FIG. 1 for continuous boiling of wort contains two recuperative heat exchangers 1 and 2 for raising the temperature of the wort and a further heat exchanger 3 which is supplied for example with live steam for raising the temperature of the wort to the boiling temperature. The apparatus also contains a heat maintaining section 4 as well as two separators 5 and 6 for depressurisation and lowering of the temperature of the wort as well as for separating off the vapour.

The recuperative heat exchanger 1 and the separator 6 are combined into one structural unit (housing 7). In the same way the heat exchanger 2 and the separator 5 are accommodated in one common housing 8.

The other elements contained in the apparatus are explained in connection with the following description of the way in which it functions.

The hopped wort is delivered to the recuperative heat exchanger by a pressure increasing pump 9 and a pipe 10 at a temperature of approximately 72° C. The wort is heated in this heat exchanger to a temperature of approximately 90° to 92° C. and then passes via a pipe 11 to the recuperative heat exchanger 2 which raises the temperature of the wort to approximately 110° to 112° C.

Then the wort is delivered via a pipe 12 to a heat exchanger 3 which raises the temperature of the wort to the boiling temperature, for example approximately 140° C. The wort is under a pressure of approximately 3.5 bars.

The wort passes via a pipe 13 into the heat maintaining zone 4 in which the pressure and the temperature are maintained by means of a pressure maintaining valve 15. The isomerisation and coagulation of the albumin take place in this heat maintaining zone.

The wort then passes through the pressure release loop 16 in which the kinetic energy is somewhat reduced before it enters the separator 5 through a tangential inlet 17. Here the wort is depressurised to some extent, so that the temperature is lowered to approximately 120° C. With this depressurisation the vapours are separated off and—as will be explained in greater detail in connection with FIGS. 2 and 3—rise into the upper space in the housing 8 and there form the heating medium for the recuperative heat exchanger 2.

The wort collects in the lower region of the separating chamber 18 and is extracted via a filling level regulating valve 19 and a pipe 20. The filling level regulating valve 19 is controlled by two pressure gauges 21, 22 which measure according to the difference principle.

The condensate obtained in the heat exchanger is drawn off via a control valve 23 which is controlled by a temperature gauge 24 which measures the temperature of the wort in the pipe 20.

The wort then passes via the pipe 20 and a tangential inlet 25 into the separator 6 in which it is depressurised to atmospheric pressure, during which its temperature is lowered to approximately 100° C. The vapour produced during this depressurisation rises into the upper part of the housing 7 and there forms the heating medium for the recuperative heat exchanger 1.

The wort is extracted from the separator 6 via a pipe 26 and a pump 27, the filling level being maintained in the lower region of the separator 6 by a filling level regulating valve 28 which receives its signals from two pressure gauges 29, 30.

The condensate is extracted from the heat exchanger 1 via a pipe 31 with a siphon 32 and a shut-off valve 33.

A first embodiment of a combined heat exchanger and separator is shown in FIG. 2. As already explained in connection with FIG. 1, the recuperative heat exchanger 1 and the separator 6 are accommodated in a common housing 7 (the same applies to the heat exchanger 2 and the separator 5, so a separate description thereof is superfluous).

The housing 7 is divided by a partition 34 into two chambers 35, 36 lying one above the other, of which the lower chamber 35 forms the separating chamber and the upper chamber 36 contains the heat exchanger 1. The partition is provided with a central opening 37 and a plurality of peripheral openings 38 for the vapour to pass through (arrows 39).

The heat exchanger 1 is formed by two helical pipes 40, 41 which are arranged coaxially one inside the other and are advantageously joined in parallel. The inlet connection 42 and the outlet connection 43 for the wort are provided in the cover 7a of the housing so that the heat exchanger 1 can be removed from the rest of the housing body with the housing cover 7a.

In the illustrated embodiment the wort inlet connection 42 is connected to the lower end of the heat exchanger 1 and the outlet connection 43 is connected to the upper end thereof. However, the reverse connection is also possible within the scope of the invention.

So that the condensate which forms on the helical pipes 40, 41 and drips downwards can be satisfactorily collected and prevented from entering the separating chamber 35, the partition 34 has a channel below the pipes 40, 41 and the base of the channel is provided with a connection 44 for extraction of the collected condensate.

Cleaning sprays 45 are provided in the lower and upper chambers 35 and 36 respectively of the housing 7. Finally, a vacuum valve 46 and a safety valve 47 are arranged in the housing cover. The tangential inlet for the wort is designated by 25 and the connection for the extraction of the wort is designated by 48. A manhole 49 facilitates inspection of the interior of the housing.

In the further embodiment shown in FIG. 3 the housing 7' is also divided by a partition 34' into a lower chamber 35' forming the separating chamber and an upper chamber 36' containing the heat exchanger 1'.

The partition 34' falls off conically outwards and is provided with a tubular extension 50 which forms a central opening 51 for the vapour. Leaving an annular clearance 52, this tubular extension 50 engages in a conduit 53 which projects into the upper region of the chamber 36' and is surrounded by the heat exchanger 1'. The diameter of the conduit 53 is somewhat greater than that of the opening 51 thus forming the said annular clearance 52 which is open towards the lower region of the chamber 36'.

The inlet connection for the heat exchanger 1' is designated by 43'. The condensate produced in the chamber 36' is led off via the connection 44'.

The inlet to the separating chamber 35' (is designated by 25', and the connection for extraction of the depressurised wort is designated by 48'. As in the case of the preceding embodiment, cleaning sprays 45' are provided for the two chambers 35', 36' of the housing.

The vapour formed in the separating chamber 35' when the wort is depressurised rises upwards through the tubular extension 50 and the conduit 53 (arrow 54) and a certain gas circulation can occur in the chamber 36' above the annular clearance 52.

We claim:

1. Apparatus for the continuous boiling of wort, containing
   (a) at least one recuperative heat exchanger for raising the temperature of the wort,
   (b) at least one further heat exchanger for raising the temperature of the wort to a boiling temperature higher than 100° C.,
   (c) a heat maintaining zone,
   (d) at least one separator for depressurisation and lowering of the temperature of the wort and for separating off the vapour,
   (e) the vapour being delivered to the recuperative heat exchanger as heating medium,
   characterised in that
   (f) the separator (6 or 5) and the recuperative heat exchanger (1 or 2 respectively) are combined into one structural unit (7 or 8 respectively).

2. Apparatus as claimed in claim 1, containing
   (a) at least two recuperative heat exchangers connected in series for gradual raising of the temperature of the wort,
   (b) at least two separators connected in series for gradual depressurisation and lowering of the temperature of the wort,
   (c) the vapour from the first separator being delivered to the second recuperative heat exchanger and the vapour from the second separator being delivered to the first recuperative heat exchanger,
   characterised in that
   (d) the first separator (5) is combined with the second recuperative heat exchanger (2) into one structural unit (8) and the second separator (6) is combined with the first recuperative heat exchanger (1) into one structural unit (7).

3. Apparatus as claimed in claim 1, characterised in that the housing (e.g. 7) containing the heat exchanger (e.g. 1) and the separator (e.g. 6) is divided by a partition (34) into two chambers (35, 36) lying one above the other, of which the lower chamber (35) forms the separating chamber and the upper chamber (36) contains the heat exchanger (e.g. 1), the partition (34) having at least one opening (e.g. 37, 38) for the vapour and the upper chamber (36) being provided with a connection (44) for extraction of the condensate.

4. Apparatus as claimed in claim 3, characterised in that cleaning sprays (45) are arranged in the lower and upper chambers (35, 36) of the housing (7).

5. Apparatus as claimed in claim 1, characterised in that the heat exchanger (1, 2) is formed by a set of pipes, preferably helical pipes.

6. Apparatus as claimed in claim 5, characterised in that the wort inlet and outlet connections (42 and 43 respectively) for the heat exchanger (1) are provided in the cover (7a) of the housing (7) and the heat exchanger (1) can be removed from the rest of the housing body with the housing cover (7a).

7. Apparatus as claimed in claim 6, characterised in that the central opening (51) provided in the partition (34') is connected to a conduit (53) which is surrounded by the heat exchanger (1') and has a diameter greater than that of the opening (51).

8. Apparatus as claimed in claim 7, characterised in that the partition (34') falls off conically outwards and engates in the conduit (53) with a tubular extension (50) which forms the central opening, leaving an annular clearance (52).

* * * * *